United States Patent [19]

Wischermann

[11] 4,403,245
[45] Sep. 6, 1983

[54] METHOD AND CIRCUIT FOR TIME-CORRECTION OF DIGITAL SWITCHING SIGNALS

[75] Inventor: Gerhard Wischermann, Darmstadt, Fed. Rep. of Germany

[73] Assignee: Robert Bosch GmbH, Stuttgart, Fed. Rep. of Germany

[21] Appl. No.: 307,483

[22] Filed: Oct. 1, 1981

[30] Foreign Application Priority Data

Oct. 7, 1980 [DE] Fed. Rep. of Germany ....... 3037778

[51] Int. Cl.³ ................... H04N 9/535; H03K 5/06; H03H 15/02
[52] U.S. Cl. .................................... 358/22; 328/58; 333/166
[58] Field of Search ................. 358/22, 183; 364/577; 307/354, 263, 268; 365/94; 340/577, 607, 723, 853; 375/24; 328/146, 187, 32, 151, 150, 34, 54, 58, 53, 56; 333/166

[56] References Cited

U.S. PATENT DOCUMENTS 4,109,278 8/1978 Mendrala et al. ...................... 358/22
4,122,490 10/1978 Lish ........................................ 358/22

Primary Examiner—John C. Martin
Attorney, Agent, or Firm—Frishauf, Holtz, Goodman & Woodward

[57] ABSTRACT

A time correction value for each digital switching signal is determined and a set of switching control signals is formed which produce a progressive switching of the digital signal as a function of the time correction value. Each time correction value is stored until the following digital switching signal. The method improves chroma keying in digital color television systems.

10 Claims, 3 Drawing Figures a)

b)

c)

METHOD AND CIRCUIT FOR TIME-CORRECTION OF DIGITAL SWITCHING SIGNALS

BACKGROUND

This invention relates to a method for time-correction of digital switching signals.

A method of this kind is described in copending U.S. application Ser. No. 279,746, now U.S. Pat. No. 4,365,308, Heitmann, assigned to the assignee of this application, wherein a time-correction signal is formed for a digital switching signal, and the digital switching signal and the time-correction signal are used to generate a corrected switching signal comprising a plurality of control signals at the scanning frequency of the digital signal, the control signals being derived from a programmable read out memory and being effective to produce a progressive stepwise switching of the digital signal over a plurality of sampling periods.

The above method, however, only deals with the case where a single stepwise switching function occurs at any given time, in other words it assumes that each stepwise switching function is completed before another takes place. In many applications, however, one digital switching signal can follow another very quickly-even for example in respect of the next following sampling value of the digital signal. Depending on the spacing of the switching signals, therefore, another stepwise switching function is required.

THE INVENTION

It is the object, based upon the principles of the method in accordance with the above-mentioned patent, to generate corrected switching signals which with any given interval of time between the uncorrected digital switching signals provide a correct period of time for the changeover.

Accordingly the invention provides a method and circuit for the time-correction of digital switching signals which can occur only at discrete times as a consequence of the sampling process by which the digital signal to be switched is derived and which is therefore delayed relative to its desired time of occurrence, the method comprising deriving a time correction signal whose value is dependent upon the amount by which the digital switching signal is delayed relative to the desired time, and generating a set of control signals at the sampling frequency of the digital signal and having values determined by the value of the time correction signal, the control signals collectively constituting the time-corrected switching signal and being effective to produce a progressive switching of the digital signal over a plurality of sampling periods, the time correction signal for each digital switching signal being stored and, immediately upon the occurrence of the next following digital switching signal, being replaced in storage by the time correction signal corresponding to that next digital switching signal whereby a fresh set of control signals are produced irrespective of whether the set corresponding to the previous digital switching signal are completed.

The method according to the invention has the advantage that in the case of digital colour television systems a trouble-free changeover from one colour television signal to another and vice versa is possible even if the switching-on period of one of the colour television signals amounts only to the sampling time of one or a few picture points (sampling periods).

BRIEF DESCRIPTION OF THE DRAWINGS

Embodiments of the invention will now be described, by way of example, with reference to the accompanying drawings, wherein.

DESCRIPTION OF THE PREFERRED EMBODIMENTS

Since the present invention uses the basic techniques described in copending U.S. patent application Ser. No. 279,746, filed July 2, 1981, now Pat. No. 4,365,308, it is not necessary to describe in detail the manner in which the time correction signal is derived, however, its effect is briefly discussed in connection with FIG. 1.

Figure 1:
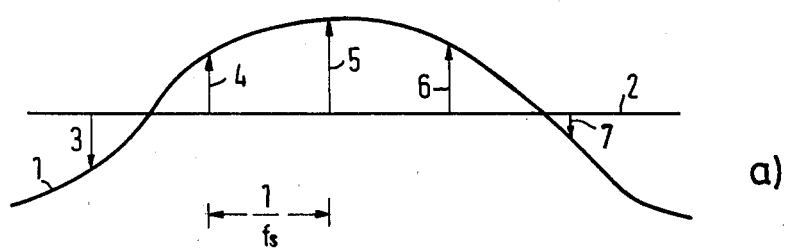
FIG. 1 are voltage time diagrams of various signals occurring in a typical switching operation according to the invention.
Figure 1:
Figure 1:
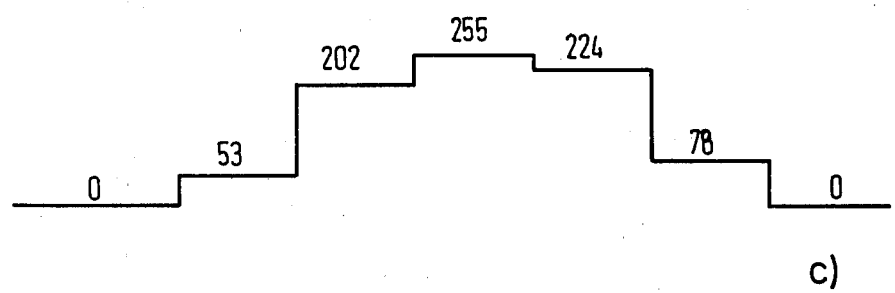

FIG. 1 shows in line a the waveform of an analogue signal from which switching signals are to be derived. This analogue signal is, for example, itself derived from a so-called foreground signal for the purpose of chroma keying onto a background signal.

Signal 1 is compared for this purpose with a threshold value 2. Since however the television system is a digital system the analogue signal is converted to digital form prior to the comparison so that a continuous signal is not present but only the sampled values 3, 4, 5, 6, 7. Since signal 1 (in digital form) does not rise above the threshold value 2 until sampling value 4 and does not fall below the threshold value 2 again until sampling value 7, the digital switching pulse illustrated in line b of FIG. 1 occurs, of which the leading and trailing edges constitute the actual digital switching signals. According to the method described in the referenced patent the leading and trailing edges of the switching pulse $S_d$ shown in line b would give rise to the distributed corrected switching signal $S_{korr}$ shown in line c. The numerical values given to the individual steps correspond to the degree of cross-fading. At 0 one of the input signals (the background signal) is passed on fully to the output and at 255 the other input signal (the foreground signal) is passed on fully to the output. The values 53,202 and 255 correspond to the set of control signals generated by the leading edge of the switching pulse $S_d$ and the values 224,78 and 0 correspond to the set of control signals generated by the trailing edge of pulse $S_d$. In this regard it is to be noted that for simplicity only three control signals are assigned to each edge (switching signal) of the digital switching pulse $S_d$, in contrast to the four signals of the referenced patent. However, it is to be understood that in general the switching can be distributed over as many sampling periods as desired, referred to hereinafter as n periods. It is also to be noted that in FIG. 1 the second switching signal (trailing edge of pulse $S_d$) in line b occurs sufficiently later than the first switching signal (leading edge) for the foreground signal to be fully faded-in before it is subsequently faded out again.

However, if the threshold 2 is raised, for example, then the digital switching pulse $S_d$ becomes correspondingly shorter. There is therefore not sufficient time for the foreground signal to be fully faded-in and thus the increasing portion of the stepwise function $S_{korr}$, corresponding to the control signals generated by the leading edge of the switching pulse $S_d$, must be discontinued when the trailing edge of the digital switching pulse $S_d$ occurs and the stepwise function modified appropriate to the time position of this traling edge taking into consideration the associated correction signal.

Figure 2:
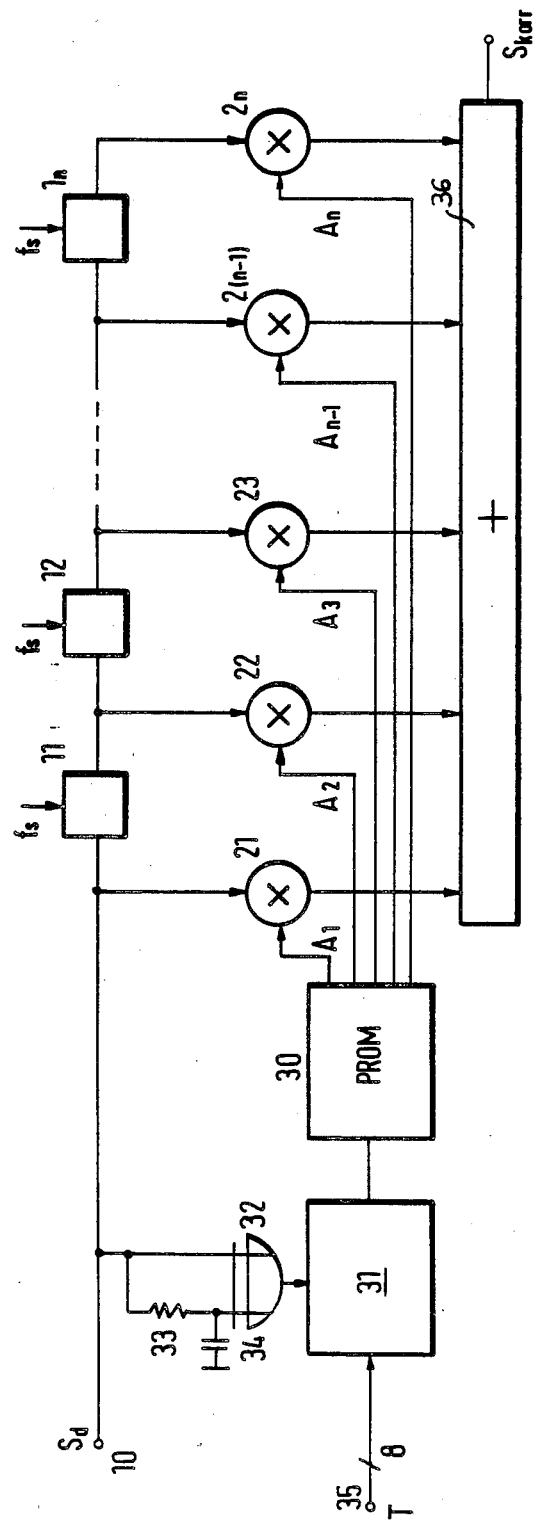
FIG. 2 is a block diagram of a first embodiment for implementing the method according to the invention.

For this purpose an adaptive, non-recursive digital filter as illustrated in FIG. 2 may be used. The digital switching pulse $S_d$ is fed at 10 to the arrangement according to FIG. 2 and passes through successive clocked delay means 11, 12 to 1n each providing a delay of one sampling period. For this purpose a clock signal with the sampling frequency $f_s$ of the digital signal is applied to the delay members 11 to 1n. The undelayed switching pulse $S_d$ and also the delayed switching pulses are fed to multiplier stages 21, 22, 23 to 2n respectively. Each multiplier stage is also supplied with a respective multiplier $A_1$ to $A_n$ supplied from a programmable read-out memory (PROM) 30, the input of the latter being loaded with the current time correction signal T which is located in an intermediate storage 31 and which determines the values of the multipliers $A_1$ to $A_n$. The outputs of the multipliers are connected with inputs of an adder 36. The sum of the output signals of the multiplier stages provide the control signals constituting the distributed correction signal $S_{korr}$. The intermediate storage 31 operates as a sample-and-hold circuit, for which purpose a scanning signal is supplied to it which is produced from the switching pulse $S_d$ with the aid of an EX-OR circuit 32 and a delay element 33, 34. This ensures that immediately an edge (switching signal) of the switching pulse $S_d$ is present at the input 10 the corresponding value of the time correction signal present at the input 35 of the intermediate storage 31 is taken into the intermediate storage for control of the PROM 30 to produce new values of $A_1$ to $A_n$.

Figure 3:
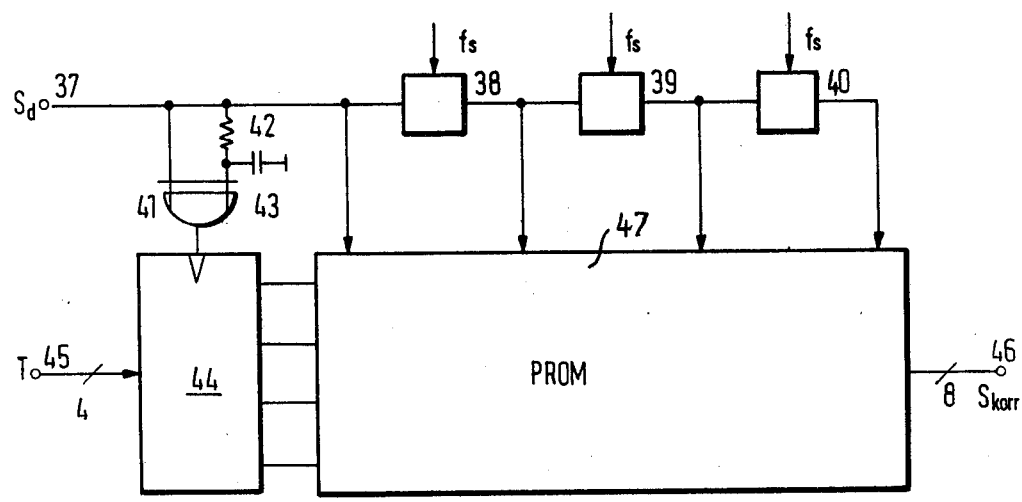
FIG. 3 is a block diagram of a second embodiment for implementing the method.

In the case of the arrangement according to FIG. 3 the multiplier circuits and the programmable read-out memory 30 according to FIG. 2 are combined in a corresponding programmable read only memory (PROM) 36. In addition in the arrangement according to FIG. 3 the switching pulse fed at 37 is successively delayed by the clocked delay lines 38, 39, 40 by one scanning period and is also converted with the EXCLUSIVE-OR (EX-OR) switching circuit 41 and the delay element 42, 43 into a scanning signal, corresponding to the edges of the switching pulse, for the intermediate storage 44. The time correction signal is fed at 45 to the intermediate storage 44. At the output 46 of the programmable read-only memory (PROM) 47 the time-corrected digital switching signal $S_{korr}$ is then avalable for further use.

I claim:

1. A method for the time-correction of digital switching signals which can occur only at discrete times as a consequence of the sampling process by which the digital signal to be switched is derived and which is therefore delayed relative to its desired time of occurrence, the method comprising deriving a time correction signal whose value is dependent upon the amount by which the digital switching signal is delayed relative to the desired time, and generating a set of control signals at the sampling frequency of the digital signal and having values determined by the value of the time correction signal, the control signals collectively constituting the time-corrected switching signal and being effective to produce a progressive switching of the digital signal over a plurality of sampling periods, the time correction signal for each digital switching signal being stored and, immediately upon the occurrence of the next following digital switching signal, being replaced in storage by the time correction signal corresponding to that next digital switching signal whereby a fresh set of control signals are produced irrespective of whether the set corresponding to the previous digital switching signal are completed.

2. Method as claimed in claim 1, including the step of producing the corrected digital switching signals by a non-recursive digital filter controllable by said time correction signal.

3. A circuit arrangement for time correction of digital switching signals comprising a series of delay elements each with a delay of one sampling period, the digital switching signals being fed to a first delay element of the series, a plurality of multiplier stages, the input of each delay element and the output of the last delay element being connected each to one input of a respective multiplier stage, a programmable read-only memory having a plurality of outputs connected each to a further input of a respective multiplier stage, the input of the programmable read-out memory being supplied with the current time correction signal via a sample and hold circuit (31) to which is fed a sampling signal upon the occurrence of each digital switching signal, and an adding circuit the inputs of which are connected to the outputs of the multiplier stages, the output of the adder forming the control signals.

4. A circuit arrangement for time correction of digital switching signals comprising a series of delay elements each with a delay of one sampling period, the digital switching signals being fed to a first delay element of the series, a programmable read-only memory having a plurality of inputs connected respectively to the input of each delay element and to the output of the last delay element, and a further input of the programmable read-only memory being supplied with the current time correction signal via a sample-and-hold circuit to which is fed a sampling signal upon the occurrence of each digital switching signal.

5. A circuit arrangement as claimed in claim 3, wherein for providing the sampling signal the digital switching signals are fed on the one hand directly and on the other hand via a delay circuit to the inputs of an EX-OR circuit.

6. A circuit arrangement as claimed in claim 4, wherein for providing the sampling signal the digital switching signals are fed on the one hand directly and on the other hand via a delay circuit to the inputs of an EX-OR circuit.

7. A circuit arrangement according to claim 3, including a non-recursive digital filter controllable by said time correction signal fo producing the corrected digital switching signals.

8. A circuit arrangement according to claim 4, including a non-recursive digital filter controllable by said time correction signal for producing the corrected digital switching signals.

9. A circuit arrangement according to claim 5, including a non-recursive digital filter controllable by said time correction signal for producing the corrected digital switching signals.

10. A circuit arrangement according to claim 6, including a non-recursive digital filter controllable by said time correction signal for producing the corrected digital switching signals.

* * * * *